United States Patent
Kim et al.

(10) Patent No.: US 11,017,315 B2
(45) Date of Patent: May 25, 2021

(54) FORECASTING WIND TURBINE CURTAILMENT

(71) Applicant: International Business Machines Corporation, Armonk, NY (US)

(72) Inventors: Younghun Kim, White Plains, NY (US); Srivats Shukla, Elmsford, NY (US); Lloyd A. Treinish, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 661 days.

(21) Appl. No.: 15/466,424

(22) Filed: Mar. 22, 2017

(65) Prior Publication Data

US 2018/0276554 A1    Sep. 27, 2018

(51) Int. Cl.
| | | |
|---|---|---|
| *G06N 20/00* | (2019.01) | |
| *F03D 7/02* | (2006.01) | |
| *F03D 7/04* | (2006.01) | |

(52) U.S. Cl.
CPC ............. *G06N 20/00* (2019.01); *F03D 7/028* (2013.01); *F03D 7/045* (2013.01); *F03D 7/046* (2013.01); *F03D 7/048* (2013.01); *F05B 2260/8211* (2013.01); *F05B 2270/32* (2013.01)

(58) Field of Classification Search
CPC ......... G06N 20/00; F03D 7/028; F03D 7/045; F03D 7/046; F03D 7/048; F05B 2260/8211; F05B 2270/32
See application file for complete search history.

(56) References Cited

U.S. PATENT DOCUMENTS

| | | | |
|---|---|---|---|
| 8,200,435 B2 | 6/2012 | Stiesdal | |
| 8,694,268 B2 | 4/2014 | Karikomi et al. | |
| 8,930,299 B2 | 1/2015 | Pyle et al. | |
| 2002/0159642 A1* | 10/2002 | Whitney | G06K 9/6228 |
| | | | 382/225 |
| 2010/0076613 A1* | 3/2010 | Imes | G06Q 50/06 |
| | | | 700/287 |
| 2011/0046803 A1 | 2/2011 | Kondo et al. | |
| 2011/0153096 A1 | 6/2011 | Pal et al. | |
| 2016/0056642 A1 | 2/2016 | Coe et al. | |
| 2016/0265511 A1* | 9/2016 | Petersen | F03D 15/10 |
| 2018/0230967 A1* | 8/2018 | Beatrice | F03D 7/0264 |

OTHER PUBLICATIONS

Mao et al., "A Review of Wind Power Forecasting & Prediction", 2016, all pages (Year: 2016).*

(Continued)

*Primary Examiner* — Daniel C Puentes
(74) *Attorney, Agent, or Firm* — Cantor Colburn LLP; Joseph Petrokaitis

(57) ABSTRACT

A method includes training a prediction model to forecast a likelihood of curtailment for at least one wind turbine. The prediction model is trained, by a processor system, using historical information and historical instances of curtailment. The method also includes forecasting the likelihood of curtailment for the at least one wind turbine using the trained prediction model. The method also includes outputting the forecasted likelihood.

12 Claims, 7 Drawing Sheets

(56) References Cited

OTHER PUBLICATIONS

Duchesne et al., "Machine Learning of Real-time Power Systems Reliability Management Response", Jun. 2017, IEEE Manchester PowerTech, all pages (Year: 2017).*

Anonymous "Optimizing Maintenance Operations at Wind Farms," ip.com, IP.com No. IPCOM000243102D, IP.com Electronic Publication Date: Sep. 15, 2015, 8 pages.

Anonymous "System and method to schedule the down time of wind turbines based on numerical weather forecasting," ip.com, IP.com No. IPCOM000220610D, IP.com Electronic Publication Date: Aug. 9, 2012, 7 pages.

Bird et al. "Wind and Solar Energy Curtailment: Experience and Practices in the United States," National Renewable Energy Laboratory (NREL) Technical Report, NREL/TP-6A20-60983, Mar. 2014, 58 pages.

Howarth et al. "Industry At Large: Wind Farm Operations—Renewable Energy Faces Daytime Curtailment in California," North American Windpower, Zackin Publications, 2014, 6 pages.

Mc Garrigle et al. "How much wind energy will be curtailed on the 2020 Irish power system?," Renewable Energy, vol. 55, Jul. 2013, pp. 544-553.

Wikipedia contributors, "Regional transmission organization (North America)," Wikipedia, The Free Encyclopedia, https://en.wikipedia.org/w/index.php?title=Regional_transmission_organization_(North_America)&oldid=770224183 (accessed Jan. 12, 2017), 11 pages.

\* cited by examiner

- V84_Mean
- SFROFF_Mean
- TKE_GUST_Mean
- ACSNOW_Mean
- SNOWH_Mean
- SWDDIF_Mean
- SLP_Mean
- MONTH
- PSFC_Mean
- PRATE_Mean
- V10_Mean
- K_INDEX_Mean
- RH_Mean
- VIS_Mean
- REFC_Mean
- T2_Mean
- HOUR
- SFC_GUST_Mean
- U84_Mean
- GUST_Mean
- DPT2M_Mean
- W84_Mean
- CRAIN_Mean
- U10_Mean
- SNDENS_Mean
- APCP_Mean
- LFTX_Mean
- NC_GUST_Mean
- SWDDIR_Mean
- SNOWFALL_RATE_Mean
- CAPE_SFC_Mean
- LPI_Mean
- SWDOWN_Mean
- COSMO_GUST_Mean
- SWDDNI_Mean

FIG. 1

FORECASTING WIND TURBINE CURTAILMENT

BACKGROUND

The present invention relates in general to wind turbines. More specifically, the present invention relates to forecasting a likelihood of wind turbine curtailment based at least in part on forecasted conditions.

Wind turbines convert kinetic energy of flowing wind into electrical energy, and the generated electrical energy can be sold by transferring the electrical energy to a transmission grid. A wind farm is a plurality of wind turbines that are located in relatively close proximity to each other in order to generate electricity. Wind turbines are expensive assets to build, maintain, and operate. Thus, wind turbine operators generally attempt to operate/utilize their wind turbines as efficiently as possible in order to sell/transfer as much electrical energy to the transmission grid as possible.

A variety of external factors can influence a wind turbine's overall operation, as well as its ability to transfer electrical energy to the transmission grid. For example, as described in more detail below, weather conditions can adversely influence wind turbine operation. Additionally, certain entities, such as independent system operators (ISO), can issue requirements that adversely influence wind turbine operation. The phrase "independent system operator" refers to an entity that governs the transmission grid to which the generated energy is transferred.

External factors that curtail or stop wind turbine operation are referred to as "curtailment" factors. More specifically, wind turbine "curtailment" also describes when a wind turbine stops transferring electrical energy to the transmission grid. Wind turbine curtailment can result in a reduction of earned revenue for the wind turbine operators.

SUMMARY

One or more embodiments can be directed to a computer-implemented method that trains a prediction model to forecast a likelihood of curtailment of wind turbines. If operators of windfarms are able to predict/forecast a likelihood of curtailment of their windfarms, then the operators can possibly take countermeasures to reduce the costs associated with a curtailment that subsequently occurs, as described in more detail below. According to one or more embodiments of the present invention, a computer implemented method for forecasting curtailment can include training a prediction model to forecast a likelihood of curtailment for at least one wind turbine. The prediction model is trained using historical information and historical instances of curtailment. The method can also include forecasting the likelihood of curtailment for the at least one wind turbine using the trained prediction model. The method can also include outputting the forecasted likelihood.

According to one or more embodiments, the forecasting the likelihood of curtailment can be based at least on forecasted weather conditions. As such, one or more embodiments can provide the advantage of forecasting curtailment that is caused by weather conditions.

According to one or more embodiments, the forecasted events that occur in accordance with temporal cycles can include requirements from an independent system operator. As such, one or more embodiments can provide the advantage of forecasting curtailment that is caused by independent system operators.

According to one or more embodiments of the present invention, a computer system includes a memory. The computer system also includes a processor system communicatively coupled to the memory. The processor system is configured to perform a method including training a prediction model to forecast a likelihood of curtailment for at least one wind turbine. The prediction model is trained using historical information and historical instances of curtailment. The method can also include forecasting the likelihood of curtailment for the at least one wind turbine using the trained prediction model. The method can also include outputting the forecasted likelihood.

According to one or more embodiments of the present invention, a computer program product including a computer-readable storage medium is provided. The computer-readable storage medium has program instructions embodied therewith. The computer-readable storage medium is not a transitory signal per se, the program instructions readable by a processor system to cause the processor system to perform a method. The method includes training a prediction model to forecast a likelihood of curtailment for at least one wind turbine. The prediction model is trained using historical information and historical instances of curtailment. The method also includes forecasting the likelihood of curtailment for the at least one wind turbine using the trained prediction model. The method also includes outputting the forecasted likelihood.

BRIEF DESCRIPTION OF THE DRAWINGS

The subject matter of the present invention is particularly pointed out and distinctly defined in the claims at the conclusion of the specification. The foregoing and other features and advantages are apparent from the following detailed description taken in conjunction with the accompanying drawings in which:

FIG. 1 illustrates a list of example forecasted weather conditions that can be used by embodiments of the present invention to forecast a likelihood of curtailment;

DETAILED DESCRIPTION

Figure 2:
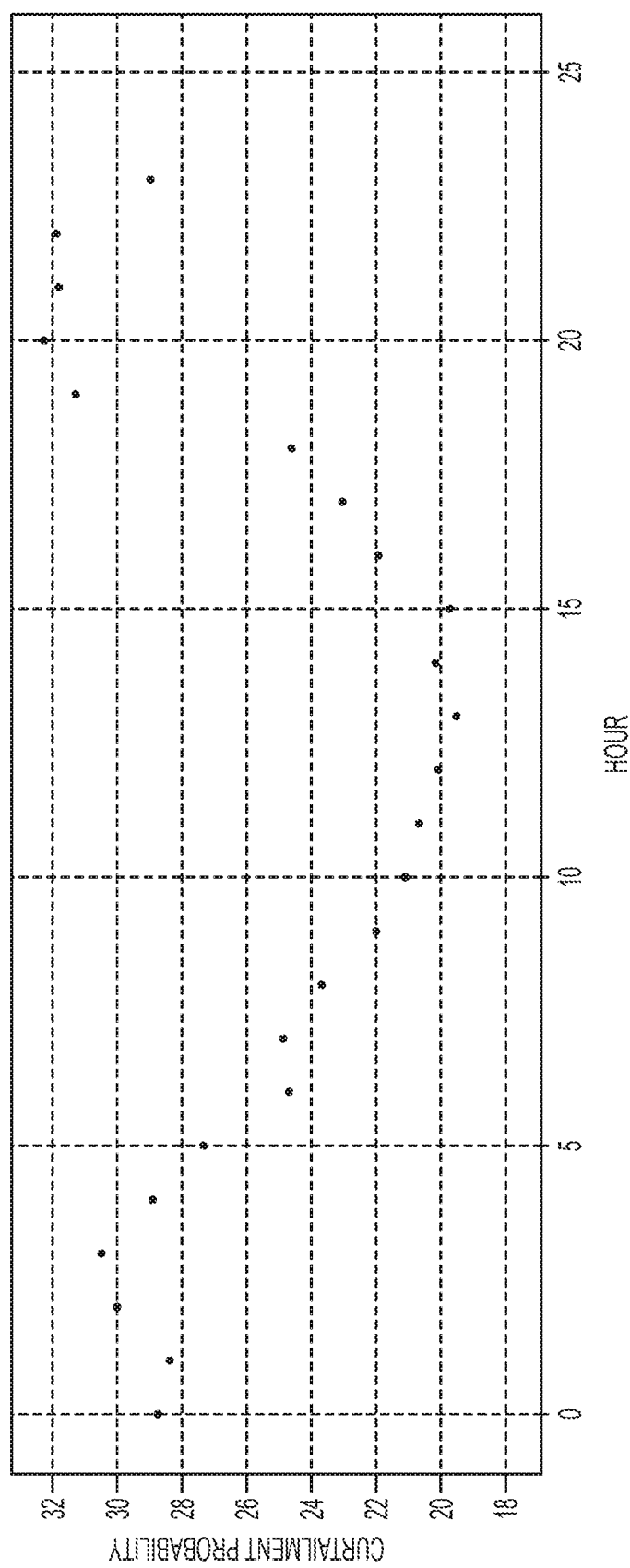
FIG. 2 illustrates different historical probabilities of curtailment as a function of a time of day, in accordance with embodiments of the present invention.

In accordance with one or more embodiments of the invention, methods and computer program products for forecasting a likelihood of curtailment of wind turbines are provided. Various embodiments of the present invention are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

As described above, when operating a wind turbine in accordance with the previous approaches, an operator of a wind turbine would consider the costs associated with curtailment as being inevitable costs, and the operator would simply bear the accrued. However, as described above, if operators of windfarms are able to predict/forecast a likelihood of curtailment of their windfarms, then the operators can possibly take countermeasures to reduce the costs associated with a curtailment that subsequently occurs. As one example countermeasure for reducing the costs associated with curtailment by ISO, operators of wind turbines can engage in day-ahead market participation. "Day-ahead market participation" is a phrase that refers to making a commitment to provide a certain amount of energy to the transmission grid in advance of the day that the energy is to be provided. When a wind farm operator engages in day-ahead market participation, the subsequent use of the wind farm to generate the committed amount of energy cannot be curtailed by an ISO.

As another example countermeasure for reducing the costs associated with curtailment by ISO, operators of wind turbines can store energy that is generated by their wind turbines, where the generated energy would otherwise have been disallowed from being transferred to the transmission grid. Specifically, if a wind turbine operator predicts that curtailment will likely occur in the future, then the operator can make arrangements to configure an energy storage unit to store energy that is generated during the duration of the curtailment. The operator can later sell stored energy to the transmission grid when it is permissible to do so.

As another example countermeasure for reducing the costs associated with curtailment by ISO, operators of wind turbines can coordinate consumers to use energy at certain times in order to avoid congestion of the transmission grid. For example, by coordinating consumers to consume energy at times when congestion tends to occur, operators can cause energy to be transferred away from the transmission grid at those important times, and thus congestion of the transmission grid can be avoided. As congestion is avoided, operators can reduce the need for curtailment of the wind turbines. For example, suppose a ski resort consumes a large quantity of electrical energy in order to create artificial snow upon the slopes of the ski resort. In this example, operators of a wind turbine can request the ski resort to create the artificial snow (and thus consume electrical energy from the transmission grid) at certain strategic times that allow the transmission grid to avoid congestion.

In view of the difficulties associated with the previous approaches of operating wind turbines, one or more embodiments are directed to a computer system that forecasts a likelihood of curtailment of wind turbines for operators. One or more embodiments can forecast the likelihood of curtailment using a computer-implemented prediction model. As discussed in more detail below, one or more embodiments can train the prediction model using historical information and historical instances of curtailment. The historical information can include historical weather forecasts and/or historical forecasted events (that occurred in accordance with temporal cycles), for example. One or more embodiments can use the trained prediction model to forecast the likelihood of curtailment, by inputting at least one or more forecasted weather or forecasted events into the trained prediction model. The forecasted events can occur in accordance with temporal cycles, as discussed in more detail below.

The historical weather forecasts (that are used to train the prediction model) and the forecasted weather (that is inputted into the trained prediction model) can correspond to forecasts of the same type of weather feature. The historical forecasted events (that are used to train the prediction model) and the forecasted events (that are inputted into the trained prediction mode) can correspond to forecasts of the same type of events.

With regard to forecasting a likelihood of curtailment based at least on forecasted weather, one or more embodiments can use micro-weather forecasting. "Micro-weather forecasting" is a phrase that generally means forecasting weather conditions that occur at the specific location of a windfarm, or even at the specific location of a specific wind turbine of a windfarm.

For example, the computer system of one or more embodiments can forecast curtailment based on a forecasted wind strength at a wind turbine. If the wind at a wind turbine is forecasted to be too strong, where strong wind can physically damage the wind turbine, then one or more embodiments can determine that there is an increased likelihood curtailment. If the wind at the wind turbine is forecasted to be jittery (i.e., the wind is forecasted to be of inconsistent strength or speed), where jittery wind does not produce energy efficiently, then one or more embodiments can determine that there is an increased likelihood curtailment. If the wind at the wind turbine is forecasted to be too weak, where weak wind is not able to generate energy at all, then there is an increased likelihood of forecasting curtailment as occurring.

Further, one or more embodiments can forecast curtailment based on a forecasted temperature. For example, low temperatures in conjunction with precipitation can cause freezing rain, and freezing rain can cause icing to occur on the wind turbines. Therefore, if temperatures are forecasted to be below a certain threshold, then one or more embodiments can determine that there is an increased likelihood of curtailment. Additionally, weather that is too hot can also affect the performance/durability of the wind turbine. Therefore, if temperatures are forecasted to be above a certain threshold, then one or more embodiments can determine that there is an increased likelihood of curtailment.

One or more embodiments of the present invention also forecast the likelihood of curtailment based on a forecasted irradiance. "Irradiance" is a measurement of the brightness of a given day. Embodiments of the present invention can also forecast the likelihood of curtailment based on a forecasted visibility. "Visibility" is a measurement that describes how clear the present air is, which can depend, at least, upon how much water vapor is present within the air.

FIG. 1 illustrates a list of example forecasted weather conditions that can be used by embodiments of the present invention to forecast a likelihood of curtailment. As discussed above, a prediction model can consider one or more of these forecasted weather conditions to forecast a likelihood of curtailment. Embodiments can use any of, but are not limited to, the following examples of forecasted weather conditions. Referring to FIG. 1, "V84_Mean" can refer to a forecasted wind speed, in a particular direction, at a particular height. "SFROFF_Mean" can refer to a forecasted surface runoff measurement. "ACSNOW_Mean" can refer to a forecasted measurement relating to snow. "VIS_Mean" can refer to a forecasted visibility. "GUST_Mean" can refer to a measurement relating to a gust wind. "SNDENS_Mean" can refer to a measurement relating to snow density. "K_INDEX_Mean" can refer to a measurement relating to k index. "RH_Mean" can refer to a measurement relating to relative humidity. "SLP_Mean" can refer to a seal level pressure. "SNOWFALL_RATE_Mean" can refer to a measurement relating to snowfall rate.

With regard to forecasting a likelihood of curtailment based on forecasted events that occur in accordance with temporal cycles, the events can occur on an hourly, daily, weekly, and/or monthly basis. Requirements/constraints originating from an ISO and/or originating from other external entities can constitute an example event that occurs in accordance with temporal cycles. Once the ISO determines that an amount of energy/electricity within a transmission grid has met a certain limit (i.e., once the ISO determines that the transmission grid is congested), the ISO can instruct one or more wind turbines to curtail energy production/transfer.

One or more embodiments can forecast the likelihood of curtailment based on a state of the transmission grid. The state of the transmission grid is affected by the amount of energy load on the energy grid, the availability of resources for generating energy for the transmission grid, and/or the capability of the transmission grid to transfer energy.

One or more embodiments can forecast the likelihood of curtailment based on a time of day. One or more embodiments can predict energy curtailment based upon the patterns of energy use throughout a day, week, month, and/or year. Because energy use varies throughout the day, one or more embodiments can forecast the likelihood of curtailment based at least on a time of day.

FIG. 2 illustrates different historical probabilities of curtailment as a function of a time of day, in accordance with embodiments of the present invention. In the example shown in FIG. 2, the historical probability of curtailment varies between 18% and 32%. For example, at LOAM, the historical probability of curtailment is approximately 21%.

Requirements relating to noise abatement can also constitute an event that occurs in accordance with a temporal cycle. At certain times of the day, an ISO or other entity can instruct wind turbines to engage in noise abatement measures in order to reduce the amount of noise emanating from the wind turbines. The noise abatement requirements tend to repeat on an hourly, daily, weekly, and/or monthly basis. One or more embodiments can forecast the likelihood of curtailment based at least on a forecasted noise-abatement requirement.

One or more embodiments of the present invention trains a prediction model to identify correlations between historical information and historical instances of curtailment. The historical forecasted information can include historical weather forecasts or historical forecasts of events (which have occurred in accordance with a temporal cycle), for example. With a trained prediction model, an operator can provide the trained prediction model with forecasted weather information and/or forecasted events (that are to occur in accordance with a temporal cycle), in order to forecast a likelihood of curtailment. As described above, the historical weather forecasts (that are used to train the prediction model) and the forecasted weather (that is inputted into the trained prediction model) can correspond to forecasts of the same type of weather feature. The historical forecasted events (that are used to train the prediction model) and the forecasted events (that are inputted into the trained prediction mode) can correspond to forecasts of the same type of events.

One or more embodiments of the present invention use a decision tree model to train a prediction model. C4.5 or C5 algorithms are example algorithms that can be used to train the prediction model. One or more embodiments can train the probabilistic model using Bayesian statistics or a variation of Bayesian methods.

Figure 3:
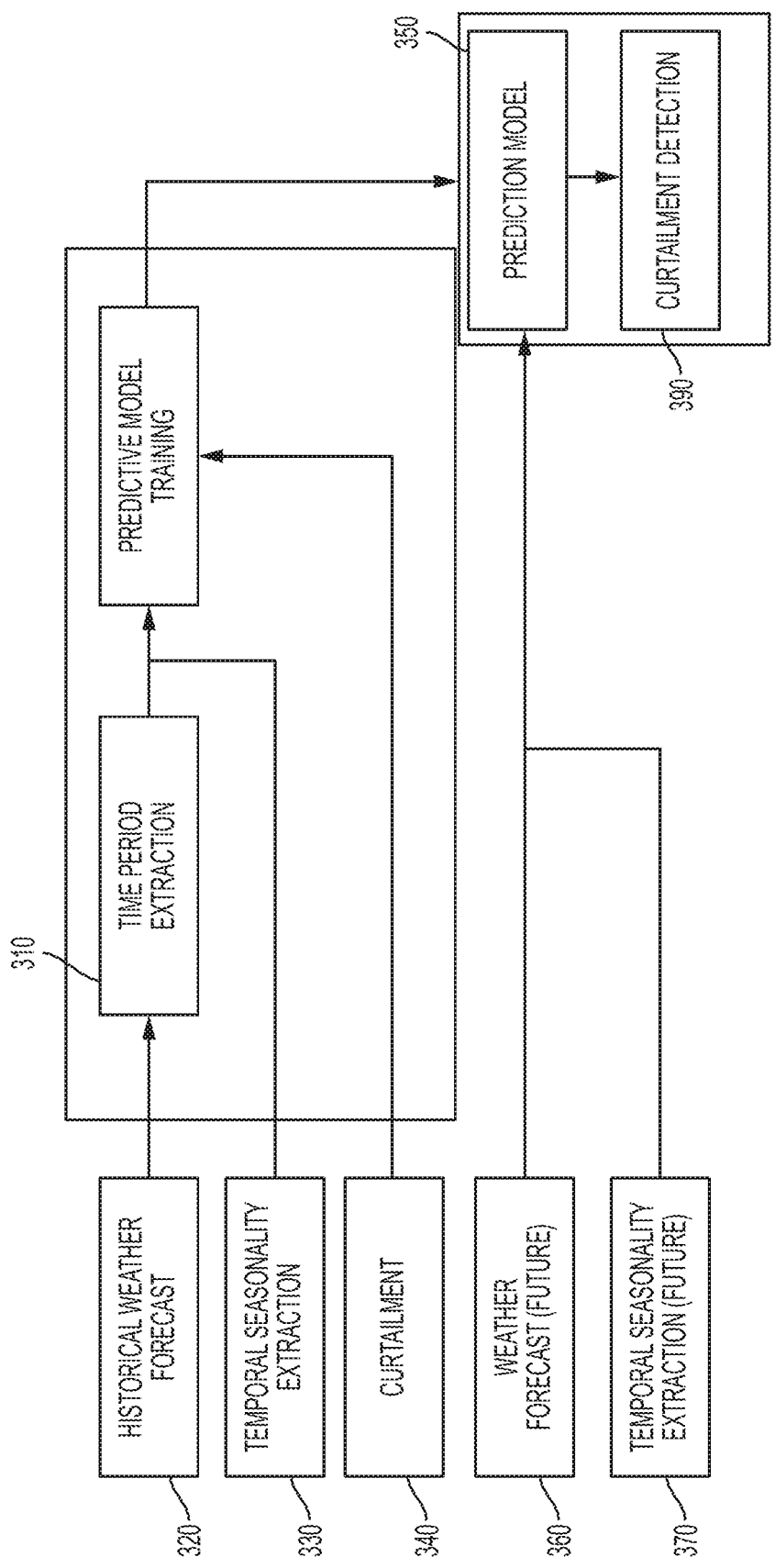
FIG. 3 illustrates a system for forecasting curtailment, in accordance with one or more embodiments.

FIG. 3 illustrates a system for forecasting curtailment, in accordance with one or more embodiments. The system can include a time period extracting unit 310 that extracts/defines a time period that is to be used for training a prediction model 350. Training a prediction model can generally refer to receiving and processing, by a computer system, different data inputs so that the computer system discovers relationships between the different data inputs and a given outcome. For example, in one or more embodiments of the present invention, the computer system can receive data inputs and discover relationships between the different data inputs and a likelihood of curtailment. The prediction model itself can be hardware-implemented and/or software-implemented within the computer system. Embodiments of the present invention can extract/define a time period that corresponds to the most recent weeks, months, or years, for example. The historical information and the historical instances of curtailment 340, which occurred during the duration of the extracted/defined time period, are used to train the prediction model, in order to identify the correlations between the historical information and the historical instances of curtailment 340. As described above, the historical information can include at least historical weather forecasts 320, for example. Historical information can also relate to historical forecasted events 330 that occurred in accordance with temporal cycles, during the extracted/defined time period.

Once prediction model 350 is trained as described above, the prediction model 350 can receive inputs corresponding to forecasted weather conditions 360 (for the future) and forecasted events 370 (for the future) that occur in accordance with temporal cycles. With the above-described inputs, prediction model 350 can then forecast a likelihood of curtailment 390. The likelihood of curtailment 390 can then be outputted to the operator via an interface, for example.

Figure 4:
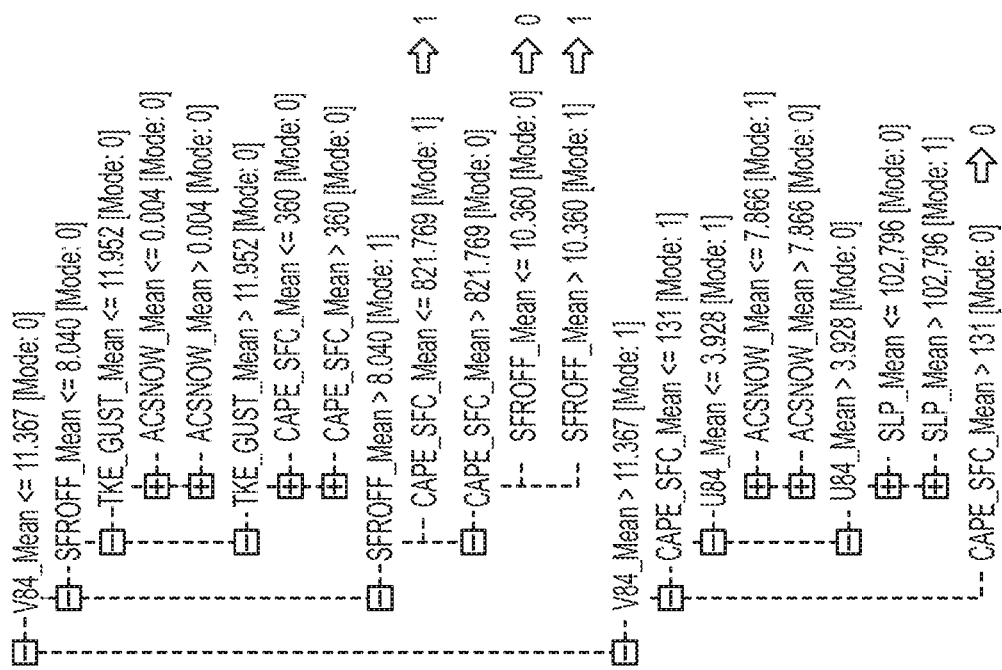
FIG. 4 illustrates an example prediction model, in accordance with embodiments of the present invention.

FIG. 4 illustrates an example prediction model, in accordance with embodiments of the present invention. Referring to FIG. 4, one or more embodiments can predict a likelihood of curtailment based at least on one or more forecasted weather conditions.

Referring to FIG. 4, if the forecasted wind speed at a height of 84 meters is less than 11.367 meters per second (i.e., if V84_Mean<=11.364), and if a forecasted mean amount of surface runoff is greater than 8.04 inches (i.e., SFROFF_Mean>8.04), and if a CAPE_SFC_Mean<=821.769, then this combination of conditions (as considered by the prediction model) is an indication that curtailment is likely to occur (i.e., mode=1). On the other hand, if the forecasted wind speed at a height of 84 meters is less than 11.367 meters per second (i.e., if V84_Mean<=11.364), and if a forecasted mean amount of surface runoff is greater than 8.04 inches (i.e., SFROFF_MEAN>8.04), and if a CAPE_SFC_Mean>821.769, and if SFROFF_Mean<=10.360, then this combination of conditions (as considered by the prediction model) is an indication that curtailment is unlikely to occur (i.e., mode=0). The prediction model of one or more embodiments can consider a plurality of combinations of different forecasted conditions. One or more embodiments can determine a cumulative/aggregate result of considering the plurality of combinations, and one or more embodiments can forecast the likelihood of curtailment based at least in part on the determined cumulative/aggregate result.

Figure 5:
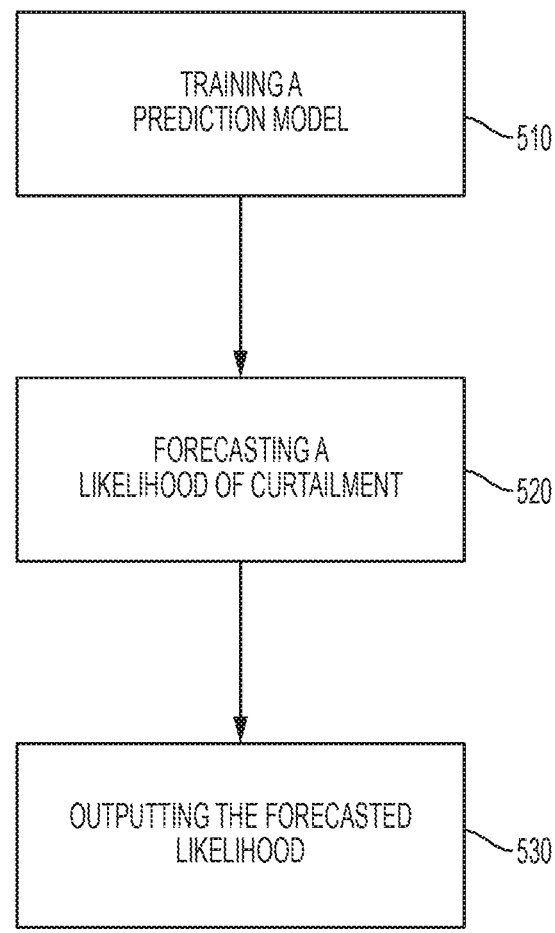
FIG. 5 depicts a flowchart of a method in accordance with one or more embodiments of the present invention.

FIG. 5 depicts a flowchart of a computer-implemented method in accordance with one or more embodiments of the present invention. The method includes, at 510, training, by a processor system, a prediction model to forecast a likelihood of curtailment for at least one wind turbine. The prediction model is trained using historical information and historical instances of curtailment. The method also includes, at 520, forecasting, by the processor system, the likelihood of curtailment for the at least one wind turbine using the trained prediction model. The method also includes, at 530, outputting, by the processor system, the forecasted likelihood.

Figure 6:
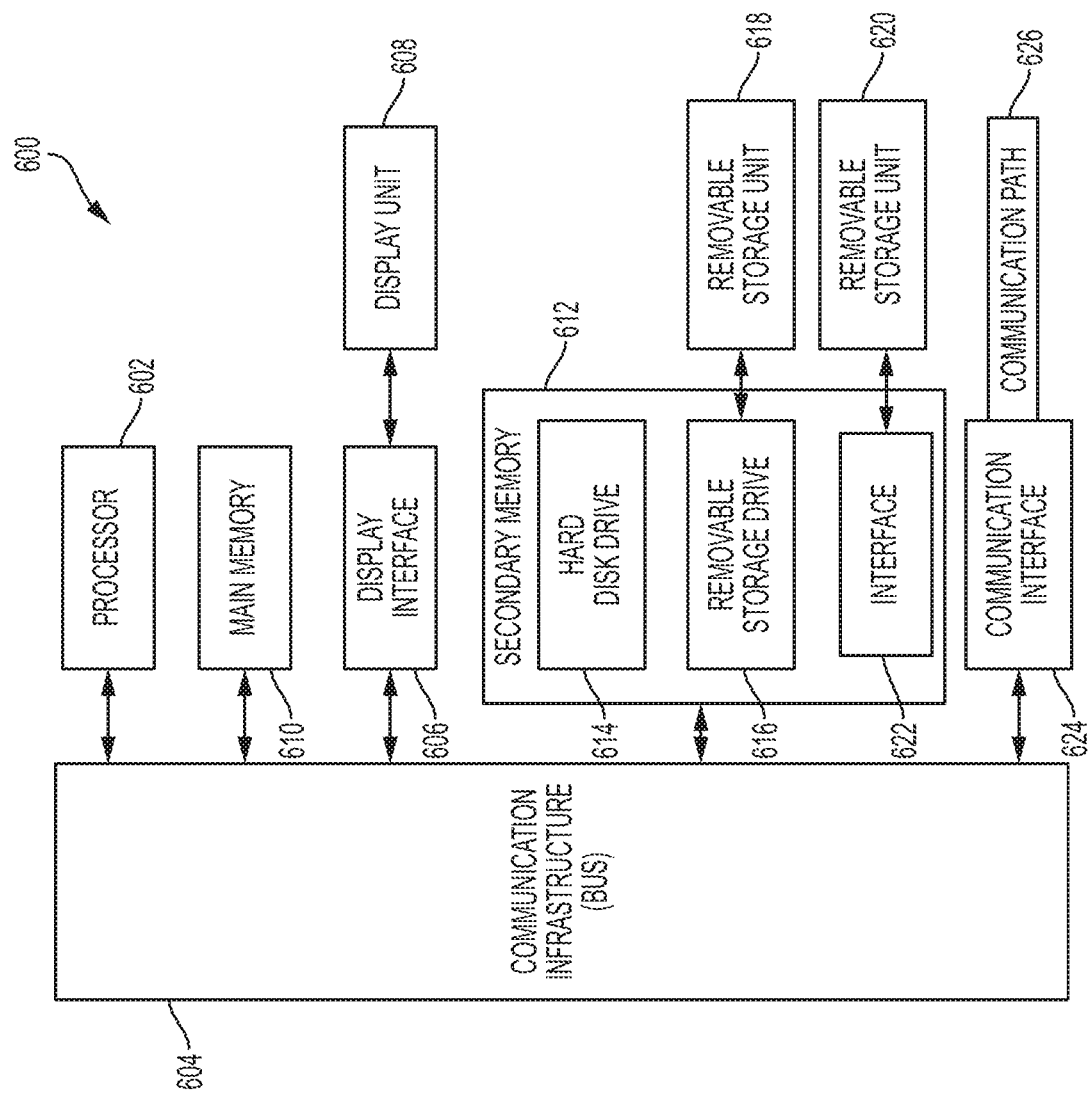
FIG. 6 depicts a high-level block diagram of a computer system, which can be used to implement one or more embodiments.

FIG. 6 depicts a high-level block diagram of a computer system 600, which can be used to implement one or more embodiments. Computer system 600 can be used to implement hardware components of systems capable of performing methods described herein. Although one exemplary computer system 600 is shown, computer system 600 includes a communication path 626, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 626, e.g., to communicate data between them.

Computer system 600 includes one or more processors, such as processor 602. Processor 602 is connected to a communication infrastructure 604 (e.g., a communications bus, cross-over bar, or network). Computer system 600 can include a display interface 606 that forwards graphics, textual content, and other data from communication infrastructure 604 (or from a frame buffer not shown) for display on a display unit 608. Computer system 600 also includes a main memory 610, preferably random access memory (RAM), and can also include a secondary memory 612. Secondary memory 612 can include, for example, a hard disk drive 614 and/or a removable storage drive 616, representing, for example, a floppy disk drive, a magnetic tape drive, or an optical disc drive. Hard disk drive 614 can be in the form of a solid state drive (SSD), a traditional magnetic disk drive, or a hybrid of the two. There also can be more than one hard disk drive 614 contained within secondary memory 612. Removable storage drive 616 reads from and/or writes to a removable storage unit 618 in a manner well known to those having ordinary skill in the art. Removable storage unit 618 represents, for example, a floppy disk, a compact disc, a magnetic tape, or an optical disc, etc. which is read by and written to by removable storage drive 616. As will be appreciated, removable storage unit 618 includes a computer-readable medium having stored therein computer software and/or data.

In alternative embodiments, secondary memory 612 can include other similar means for allowing computer programs or other instructions to be loaded into the computer system. Such means can include, for example, a removable storage unit 620 and an interface 622. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 620 and interfaces 622 which allow software and data to be transferred from the removable storage unit 620 to computer system 600.

Computer system 600 can also include a communications interface 624. Communications interface 624 allows software and data to be transferred between the computer system and external devices. Examples of communications interface 624 can include a modem, a network interface (such as an Ethernet card), a communications port, or a PC card slot and card, a universal serial bus port (USB), and the like. Software and data transferred via communications interface 624 are in the form of signals that can be, for example, electronic, electromagnetic, optical, or other signals capable of being received by communications interface 624. These signals are provided to communications interface 624 via communication path (i.e., channel) 626. Communication path 626 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 610 and secondary memory 612, removable storage drive 616, and a hard disk installed in hard disk drive 614. Computer programs (also called computer control logic) are stored in main memory 610 and/or secondary memory 612. Computer programs also can be received via communications interface 624. Such computer programs, when run, enable the computer system to perform the features discussed herein. In particular, the computer programs, when run, enable processor 602 to perform the features of the computer system. Accordingly, such computer programs represent controllers of the computer system. Thus it can be seen from the forgoing detailed description that one or more embodiments provide technical benefits and advantages.

Figure 7:
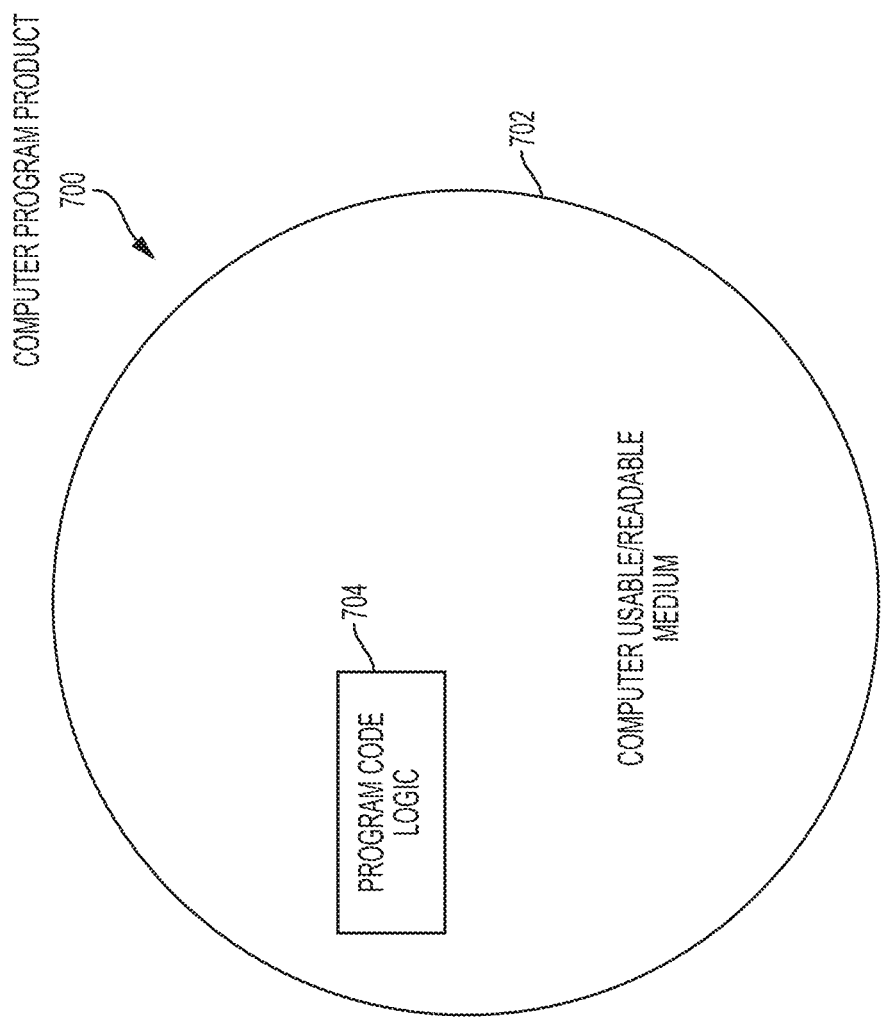
FIG. 7 depicts a computer program product, in accordance with an embodiment of the present invention.

FIG. 7 depicts a computer program product 700, in accordance with an embodiment of the present invention. Computer program product 700 includes a computer-readable storage medium 702 and program instructions 704.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In view of the above, one or more embodiments can provide the advantage of helping operators of wind turbines to forecast a likelihood of curtailment of wind turbines. One or more embodiments can provide the advantage of forecasting curtailment that is caused by weather conditions. One or more embodiments can provide the advantage of forecasting curtailment that is caused by independent system operators.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer implemented method for forecasting curtailment, the method comprising:
    training, by a processor system, a prediction model to forecast a likelihood of curtailment for at least one wind turbine, wherein the prediction model is trained using historical information and historical instances of curtailment, wherein the historical information comprises historical weather forecasts;
    forecasting, by the processor system, the likelihood of curtailment for the at least one wind turbine using the trained prediction model based at least on requirements from an independent system operator, wherein the requirements include noise abatement requirements that occur in temporal cycles;
    outputting, by the processor system, the forecasted likelihood of curtailment for the at least one wind turbine; and
    based on a determination that the forecasted likelihood is above a threshold level, configuring an energy storage unit to store energy generated during a duration of the forecasted curtailment,
    wherein the forecasted likelihood of curtailment for the at least one wind turbine is based at least in part on a state of a transmission grid configured to receive energy from the wind turbine and wherein the historical instances of curtailment include curtailment events caused by congestion in the transmission grid.

2. The computer implemented method of claim 1, wherein the forecasting the likelihood of curtailment is based at least on forecasted weather conditions.

3. The computer implemented method of claim 1, wherein the forecasting the likelihood of curtailment is based at least on forecasted events that occur in accordance with temporal cycles.

4. The computer implemented method of claim 2, wherein the forecasted weather conditions comprise a forecasted wind speed.

5. A computer system comprising:
    a memory, having program instructions stored therein; and
    a processor communicatively coupled to the memory, wherein the program instructions are readable and executable by the processor to cause the processor to:
    train a prediction model to forecast a likelihood of curtailment for at least one wind turbine, wherein the prediction model is trained using historical information and historical instances of curtailment, wherein the historical information comprises historical weather forecasts;
    forecast the likelihood of curtailment for the at least one wind turbine using the trained prediction model based at least on requirements from an independent system operator, wherein the requirements include noise abatement requirements that occur in temporal cycles; and
    output the forecasted likelihood of curtailment for the at least one wind turbine; and
    based on a determination that the forecasted likelihood is above a threshold level, configure an energy storage unit to store energy generated during a duration of the forecasted curtailment,
    wherein the forecasted likelihood of curtailment for the at least one wind turbine is based at least in part on a state of a transmission grid configured to receive energy from the wind turbine and wherein the historical instances of curtailment include curtailment events caused by congestion in the transmission grid.

6. The computer system of claim 5, wherein the forecasting the likelihood of curtailment is based at least on forecasted weather conditions.

7. The computer system of claim 5, wherein the forecasting the likelihood of curtailment is based at least on forecasted events that occur in accordance with temporal cycles.

8. The computer system of claim 6, wherein the forecasted weather conditions comprise a forecasted wind speed.

9. A computer program product for forecasting curtailment, the computer program product comprising:
    a computer-readable storage medium having program instructions embodied therewith, the program instructions readable by a processor to cause the processor to:
    train a prediction model to forecast a likelihood of curtailment for at least one wind turbine, wherein the prediction model is trained using historical information and historical instances of curtailment, wherein the historical information comprises historical weather forecasts;
    forecast the likelihood of curtailment for the at least one wind turbine using the trained prediction model based at least on requirements from an independent system operator, wherein the requirements include noise abatement requirements that occur in temporal cycles; and
    output the forecasted likelihood of curtailment for the at least one wind turbine; and
    based on a determination that the forecasted likelihood is above a threshold level, configure an energy storage unit to store energy generated during a duration of the forecasted curtailment,
    wherein the forecasted likelihood of curtailment for the at least one wind turbine is based at least in part on a state of a transmission grid configured to receive energy from the wind turbine and wherein the historical instances of curtailment include curtailment events caused by congestion in the transmission grid.

10. The computer program product of claim 9, wherein the forecasting the likelihood of curtailment is based at least on forecasted weather conditions.

11. The computer program product of claim 9, wherein the forecasting the likelihood of curtailment is based at least on forecasted events that occur in accordance with temporal cycles.

12. The computer program product of claim 10, wherein the forecasted weather conditions comprise a forecasted wind speed.

* * * * *